United States Patent
Prenger et al.

(10) Patent No.: US 11,871,315 B2
(45) Date of Patent: *Jan. 9, 2024

(54) MOBILE CONNECTIVITY PROVISIONING FOR SEGREGATED ORDER MANAGEMENT

(71) Applicant: Viasat Inc., Carlsbad, CA (US)

(72) Inventors: Roger Prenger, Gilbert, AZ (US); Joshua Righetti, Carlsbad, CA (US); Anton Hoffman, San Diego, CA (US); Sandeep Moorthy, San Marcos, CA (US); William Moseley, Encinitas, CA (US); Stephen O'Neal, Carlsbad, CA (US); James Esserman, La Jolla, CA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,342

(22) Filed: Dec. 27, 2022

(65) Prior Publication Data

US 2023/0209318 A1    Jun. 29, 2023

Related U.S. Application Data

(63) Continuation of application No. 17/263,889, filed as application No. PCT/US2018/057846 on Oct. 26, 2018, now Pat. No. 11,576,016.
(Continued)

(51) Int. Cl.
*H04W 84/06* (2009.01)
*H04W 4/40* (2018.01)
(Continued)

(52) U.S. Cl.
CPC .............. *H04W 4/40* (2018.02); *H04W 4/50* (2018.02); *H04W 76/11* (2018.02)

(58) Field of Classification Search
CPC ......... H04W 4/40; H04W 4/50; H04W 76/11; H04W 84/06
See application file for complete search history.

(56) References Cited

U.S. PATENT DOCUMENTS

| 6,185,409 B1 | 2/2001 | Threadgill et al. |
| 9,276,665 B1 | 3/2016 | Johnson et al. |

(Continued)

FOREIGN PATENT DOCUMENTS

| CN | 102273238 A | 12/2011 |
| CN | 105052184 A | 11/2015 |

OTHER PUBLICATIONS

ISA/EPO, International Search Report and Written Opinion, International App. No. PCT/US2018/057846, dated Dec. 21, 2018, European Patent Office, 12 pgs.

*Primary Examiner* — Joseph E Dean, Jr.
(74) *Attorney, Agent, or Firm* — Holland & Hart LLP (57) ABSTRACT

Systems and methods for mobile connectivity provisioning at an access network are described. The access network has a service connection to a service center that is external to the access network. The method includes receiving, from a mobile vehicle, an indication of a connection request for a device on the mobile vehicle. The connection request identifies the device using a media access control (MAC) address. The method includes generating a globally unique identifier (GUID) associated with the MAC address and transmitting a first message comprising the GUID to a network access terminal on the vehicle. The network access terminal redirects the connection request to the service center via a traffic connection. The redirected connection request includes the GUID. The access network receives an indication of a network service for the device from the service center; the indication identifies the device based on the GUID.

20 Claims, 5 Drawing Sheets

Related U.S. Application Data

(60) Provisional application No. 62/713,119, filed on Aug. 1, 2018.

(51) Int. Cl.
  *H04W 4/50* (2018.01)
  *H04W 76/11* (2018.01)

(56) References Cited

U.S. PATENT DOCUMENTS

| | | |
|---|---|---|
| 11,576,016 B2 * | 2/2023 | Prenger ................ H04W 76/11 |
| 2004/0133606 A1 | 7/2004 | Miloushev et al. |
| 2011/0110515 A1 | 5/2011 | Tidwell et al. |
| 2015/0071271 A1 | 3/2015 | Smedman et al. |
| 2016/0142327 A1 | 5/2016 | Johnson et al. |
| 2016/0165651 A1 | 6/2016 | Pathuri et al. |

\* cited by examiner

MOBILE CONNECTIVITY PROVISIONING FOR SEGREGATED ORDER MANAGEMENT

CROSS REFERENCES

The present Application for Patent is a Continuation of U.S. patent application Ser. No. 17/263,889 by Prenger et al., entitled "Mobile Connectivity Provisioning For Segregated Order Management" filed Jan. 27, 2021, which is a 371 National Phase filing of International Patent Application No. PCT/US2018/057846 by Prenger et al., entitled "Mobile Connectivity Provisioning For Segregated Order Management" filed Oct. 26, 2018, which claims the benefit of U.S. Provisional Patent Application No. 62/713,119 by Prenger, et al., entitled "Mobile Connectivity Provisioning for Segregated Order Management," filed Aug. 1, 2018, each of which are assigned to the assignee hereof, and each of which is hereby incorporated by reference in its entirety herein.

BACKGROUND

Many mass transportation vehicles, such as aircraft, ships, and trains, provide on-board network communications to enable passengers to access the Internet and other network services. In some cases, a network service provider may provision the network communications that are used to provide such services. In some cases, an external service provider, such as a fleet operator, may want to control some or all of the user interfaces and order management processes associated with providing premium network services that may require a payment by a user. Restrictions on transmission of personal information may create challenges for coordinating network provisioning and order management between a network service provider and an external service provider. Improved systems and methods for mobile connectivity provisioning for segregated order management may be useful.

SUMMARY

In view of the foregoing, aspects of mobile connectivity provisioning for segregated order management are described below.

A method of mobile connectivity provisioning for segregated order management is described. The method may include mobile connectivity provisioning at an access network that includes a network operation center having a traffic connection to at least one external network, the access network having a service connection to a service center that is external to the access network. The method may include receiving, from a network access terminal on a mobile vehicle, an indication of a connection request for a device on the mobile vehicle, where the connection request identifies the device using a media access control (MAC) address. The method may include generating a globally unique identifier (GUID) associated with the MAC address and transmitting a first message comprising the GUID to the network access terminal, where the network access terminal redirects the connection request to the service center via the traffic connection. The redirected connection request may include the GUID. The method may include receiving, from the service center via the service connection, a second message indicating a first network service for the device. The second message may identify the device based on the GUID. The method may include configuring the access network to provide the first network service for the device based on the second message.

An apparatus for mobile connectivity provisioning for segregated order management is described. The apparatus may include a processor, memory in electronic communication with the processor, and instructions stored in the memory. The instructions may be executable by the processor to cause the apparatus to receive, from a network access terminal on a mobile vehicle, an indication of a connection request for a device on the mobile vehicle, where the connection request identifies the device using a MAC address. The instructions may be executable by the processor to cause the apparatus to generate a GUID associated with the MAC address and transmit a first message comprising the GUID to the network access terminal, where the network access terminal redirects the connection request to a service center via a traffic connection. The redirected connection request may include the GUID. The instructions may be executable by the processor to cause the apparatus to receive, from the service center via a service connection, a second message indicating a first network service for the device. The second message may identify the device based on the GUID. The instructions may be executable by the processor to cause the apparatus to configure the access network to provide the first network service for the device based on the second message.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label.

DETAILED DESCRIPTION

Some mass transportation vehicles provide network services that enable passengers to access, for example, the Internet on electronic devices such as laptops or mobile phones. Network service providers may be responsible for configuring an access network that includes on-board networking devices, such as modems and gateways, to provide network services to one or more devices on the mobile vehicle. In some cases, an external service provider, such as a fleet operator, may wish to manage the user interfaces and back-end order management processes associated with providing various levels of network services; e.g., a default network service that may be provided without payment by the passenger or one or more levels of premium network services. Additionally or alternatively, an external service provider may wish to customize or update user interfaces to differentiate the provider's services from those of competitors or to monitor passenger usage of services. In this case, the network service provider and the external service provider may need to coordinate information about devices receiving network service. For example, a passenger may order, via a user interface, a premium network service, such as high-speed Internet or streaming video. An external service provider may process the order, authorize the premium network service, and potentially change the user interface(s) served to the device based on the order or on other factors.

Recent changes to privacy laws have increased the security measures that must be taken when transmitting personal information, such as personally identifiable information (PII) that may be used to determine an individual's identity or trace their activity on-line. Such personal information may include a device address that uniquely identifies a particular device accessing a network service. In this case, there may be restrictions on transmitting the device address between a network service provider and an external service provider, leading to challenges in segregating order management between the network service provider, which provisions the order on the network, and the external service provider, which serves the user interface and manages the order and payment. Various aspects of the instant application provide methods and tools for supporting privacy-compliant mobile connectivity provisioning for segregated order management, in accordance with aspects of the present disclosure.

Figure 1:
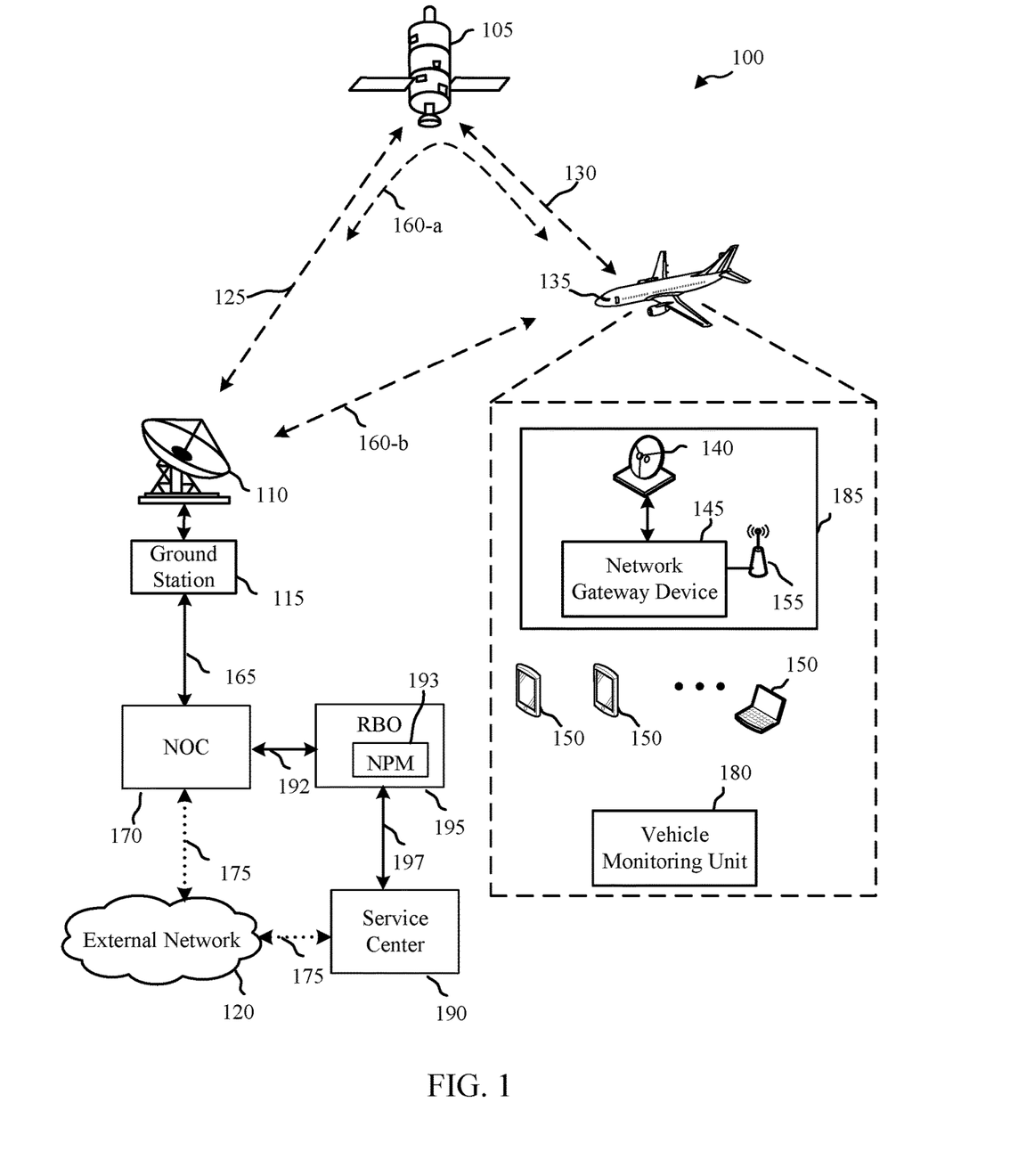
FIG. 1 shows a diagram of a communication system that supports mobile connectivity provisioning for segregated order management, in accordance with aspects of the present disclosure.

FIG. 1 shows a simplified diagram of an example communications system 100 that supports mobile connectivity provisioning for segregated order management, in accordance with aspects of the present disclosure. The communication system 100 may include a satellite 105 (or multiple satellites 105), a ground station 115, a ground station antenna system 110, and a network access terminal 185. In operation, the communication system 100 provides network services via the network access terminal 185 to multiple devices 150 on board mobile vehicle 135. For example, the communication system 100 may provide for two-way communications between the network access terminal 185 and an external network 120 via the satellite 105 and the ground station 115. The external network 120 may be, for example, one or more private or public networks (e.g., Intranets, the Internet). The network access terminal 185 may include one or more access points 155 (e.g., wireless access points (WAPS), etc.), and the devices 150 may be connected to the network access terminal 185 via the one or more access points 155. The network access terminal 185 may also include an antenna 140, which may be located in a location on the mobile vehicle 135 suitable for maintaining communications with a satellite 105 or ground station 115 (e.g., on the fuselage of an aircraft).

The satellite or satellites 105 may include any suitable type of communication satellite. In some examples, some or all of the satellites may be in geostationary orbits. In other examples, any appropriate orbit (e.g., medium earth orbit (MEO), low earth orbit (LEO), etc.) for satellite 105 may be used.

The ground station 115 sends and receives signals to and from the satellite 105 via communication link 125 using the ground station antenna system 110. The ground station antenna system 110 may be two-way capable and designed with adequate transmit power and receive sensitivity to communicate reliably with the satellite 105. The ground station 115 may be connected to a network operations center (NOC) 170 via communication link 165.

The network gateway device 145 may use antenna 140 to communicate signals with the satellite 105 via communication link 130. The antenna 140 may be mounted to an elevation and azimuth gimbal which points the antenna 140 (e.g., actively tracking) at satellite 105. The communications system 100 may operate in the International Telecommunications Union (ITU) Ku, K, or Ka-bands, for example from 17.7 to 21.2 Giga-Hertz (GHz). Alternatively, communications system 100 may operate in other frequency bands such as C-band, X-band, S-band, L-band, and the like. As illustrated in FIG. 1, network gateway device 145 and antenna 140 are mounted on a mobile vehicle 135.

In some cases, NOC 170 may communicate with a remote back office (RBO) 195, which may be a facility that is associated with the network service provider. The RBO 195 may include a network provisioning manager (NPM) 193 as part of a computing system (e.g., computing system 405 described with reference to FIG. 4) that may be used for authorizing and managing network services, communicating with external service providers, or performing other back-end functions that may support mobile connectivity provisioning for segregated order management, for example.

Figure 2:
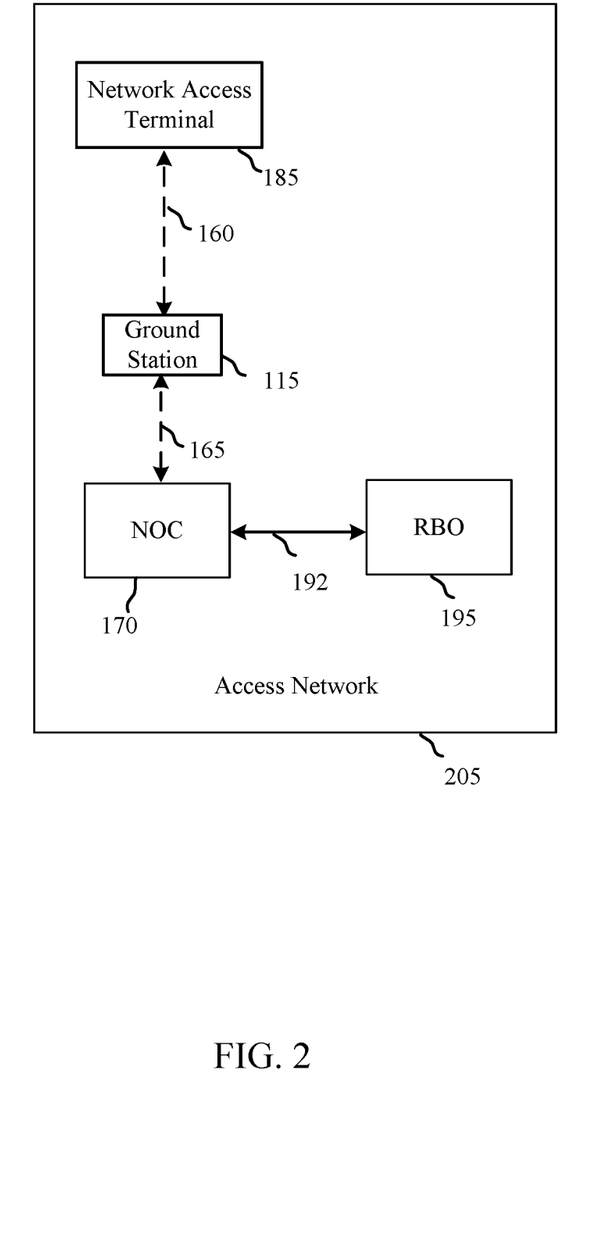
FIG. 2 shows a diagram of an access network that supports mobile connectivity provisioning for segregated order management, in accordance with aspects of the present disclosure.

In some cases, the NOC 170, RBO 195, network access terminal 185, and communication paths 160, 165, and 192 may collectively be referred as an access network, as depicted by access network 205 in FIG. 2.

Access network 205 may be configurable to provide one or more devices 150 on mobile vehicle 135 with access to various network services. For example, access network 205 may be configured to permit a device 150 to access one or more uniform resource locators (URLs) or Internet Protocol (IP) addresses, and/or to communicate with ground-based servers associated with a network service provider, an external service provider, or other networks (e.g., the Internet). Access network 205 may also perform other traffic management functions (e.g., network address assignment or translation, traffic shaping, etc.).

In some cases, access network 205 may include various electronic components, such as a processor and memory, to enable network access terminal 185 and NOC 170 to be configured to provide access to network services based on configuration information received in control signaling from RBO 195 associated with a network service provider. RBO 195 may configure the network access terminal 185 and NOC 170 to provide various network services (e.g., a default network service or a premium network service) to devices 150 on mobile vehicle 135. Subsequently, NOC 170 may communicate with external network 120 via traffic connection 175, for example, and may provide a communication link for network traffic (e.g., from or to devices 150) to external network 120.

Communication system 100 may provide for two-way communications between the network access terminal 185 and external network 120 via the satellite 105 and the ground station 115 via communication link 160-a. Alternatively, communication system 100 may provide for two-way communications between the network access terminal 185 and external network 120 and/or ground station 115 via an air-to-ground or ground-to-ground communication link 160-b (e.g., for terrestrial vehicles such as trains, ships, buses, automobiles, etc.) For example, a communication system 100 may provide for two-way communications between the network access terminal 185 and an external network 120 or ground station 115 via air-to-ground or ground-to-ground link 160-b without the use of a satellite 105.

In some cases, each device 150 may be associated with a static identifier that uniquely identifies the device 150. For example, Media Access Control (MAC) addresses are unique identifiers assigned to some hardware components (e.g., a network interface component of the device). Access network 205 may manage network services for devices 150 based on a unique identifier such as their MAC addresses. For example, traffic associated with a particular device 150 may be recognized when the source or destination address corresponds (e.g., directly or via network address translation) to the known MAC address of the device 150. The traffic may then be managed (e.g., authorized, prioritized, shaped, etc.) according to a level of service associated with the device. For example, if the device is authorized for a level of service corresponding to a provisioned data rate (e.g., minimum information rate (minIR), committed information rate (CIR), peak information rate (PIR), etc.), traffic associated with the device may be managed to the given data rate (e.g., by prioritization, traffic shaping, etc.).

In some cases, static identifiers such as MAC addresses may be considered as personal information (e.g., PII) and may be subject to transmission restrictions. For example, transmission of PII may require additional security, or may generally be limited to uses that are necessary or directly related to a customer-initiated function.

In some cases, RBO 195 may receive an indication of a connection request for a device 150 on mobile vehicle 135. For example, access point 155 may broadcast an available connection (e.g., service set identifier (SSID)) on the mobile vehicle 135 and the device 150 may connect to the access point 155. RBO 195 may receive the indication of the connection request in a message from network access terminal 185. The message may include the MAC address of the device 150 to enable access network 205 to provision network services for the device 150.

In response to receiving the message, RBO 195 may configure the access network 205 including network access terminal 185 and NOC 170 to provide a network service to the device 150 by transmitting a message with configuration information to network access terminal 185 and NOC 170, for example.

In some cases, upon receiving an indication of a connection request, RBO 195 may configure access network 205 to provide a default network service to device 150, which may include providing access to a "white list" of one or more URLs that device 150 may access without providing payment. In some cases, the white list may include the URL of a portal that may enable a user of device 150 to select and order a premium network service. A portal may be served (e.g., transmitted or provided) to the device 150 as a web page or web application.

In some cases, a network service provider may, via access network 205, serve the portal and manage orders of premium network services along with provisioning the network services. In this case, the access network 205 may use the MAC address of the device 150 to serve the portal and manage the network services for device 150, which may include permitting device 150 to access external network 120, for example. Providing such network services may involve transmission of the MAC address between access network 205 and external network 120 as part of typical Internet Protocol (IP) traffic. This usage of the MAC address may not be subject to privacy regulations, since the MAC address is used as an address for direct communication with device 150. That is, the MAC address, when used as addressing information for network routing associated with customer-initiated network communications, may not be considered to be PII. However, as previously discussed, in some cases an external service provider (e.g., at service center 190) may wish to serve the portal and manage the orders for premium services, thus segregating network provisioning from order management. In this case, the external service provider may need to identify a device 150 to serve the portal to the device, process an order for premium network service, and provide an authorization of the network premium service for the device to the network service provider. Both the network service provider and the external service provider may therefore need to be able to identify the device for which the premium service is to be provided.

In the absence of privacy regulation, a network service provider may choose to transmit the device's MAC address from the access network 205 (e.g., from RBO 195) to the external service provider (e.g., service center 190) on service connection 197 to enable this segregation of network provisioning and order management. In the context of privacy regulation, however, such transmission of the MAC address may be restricted, because in this case the MAC address is essentially transmitted as user data rather than as an address for use in typical IP traffic, and thus may be considered as PII. Accordingly, alternative strategies are needed for enabling an external service provider to identify a device 150 and to coordinate order management and network provisioning between a network service provider (e.g., at NOC 170 and/or RBO 195) and an external service provider (e.g., at service center 190). According to various aspects, these strategies may include generating an anonymized identifier for a device 150 that may be used to identify device 150 in communications between the service center 190 and the access network 205 and/or in communications between the service center 205 and the device 105, for example. In some cases, an anonymized identifier may be used to anonymize communications with a device 150. An anonymized identifier may not be considered as PII because it may not be directly traceable (e.g., without additional information) to a device 150 or a user. In some cases, an anonymized identifier may be a unique identifier associated with a particular device 150 or with a particular MAC address. In some cases, an anonymized identifier may be a semi-static identifier; e.g., the anonymized identifier may still be used to identify 150 after device 150 connects to a different network or is power cycled. In some cases, anonymized identifiers may be used for a limited amount of time before a new anonymized identifier is generated for a device 150. In some cases, a record of an association between an anonymized identifier and a static identifier of the device 150 may be retained for a limited amount of time (e.g., 30 days, 60 days, etc.) after the device 150 disconnects from the network, after which the record is destroyed. In some cases, when a device 150 initiates a connection to a network service via an access network 205, the access network 205 may generate an anonymized identifier to identify the device 150 and provide the anonymized identifier to a service center 190. The anonymized identifier may be used in subsequent communications between the access network 205 and the service center 190 to enable privacy-compliant mobile connectivity provisioning for segregated order management.

In some cases, an anonymized identifier may be a global unique identifier (GUID) that may be used to identify a device 150 in communications between the service center 190 and the access network 205, as described below. As used herein, a GUID is an example of an anonymized identifier that is associated with a static identifier for a device on a network.

In some cases, RBO 195 may communicate with service center 190 via service connection 197. Service connection 197 may provide a direct communication link between RBO 195 and service center 190, for example. Alternatively, service connection 197 may be a logical direct connection between service center 190 and RBO 195 but may include one or more direct or indirect physical network connections, including via nodes of external network 120.

Service center 190 may also communicate with external network 120 via service center traffic connection 175. Service center traffic connection 175 may be, for example, an Internet connection (e.g., provided by an Internet service provider (ISP) that may be different from the network service provider of NOC 170).

In some cases, when network access terminal 185 receives a connection request from a device 150, network access terminal 185 may send an indication of the connection request, along with the MAC address for device 150, to the RBO 195 of access network 205.

In some cases, in response to receiving the indication of the connection request, RBO 195 may generate a GUID that is associated with the MAC address. Such a GUID may be used to identify a device 150. The GUID may be generated according to established techniques for generating a unique and anonymized identifier. RBO 195 may encrypt the GUID and transmit the encrypted GUID to the network access terminal 185. The RBO may also transmit a message to the NOC 170 authorizing the default network service for device 150; this message may identify the device 150 using the MAC address. Based on the message, the access network 205 (e.g., NOC 170 and network access terminal 185) may be configured provide the default service to the device 150. For example, the network access terminal 185 may be configured to open a firewall for traffic from or to the device 150, and NOC 17 may be configured to allow the device to reach one or more destinations via external network 120 (e.g., service center 190).

The network access terminal 185 may be configured to redirect the connection request to the service center 190. The redirected connection request may include the GUID, for example. The redirected connection request may be transmitted from the NOC 170 to the service center 190 via traffic connection 175; e.g., as normal IP traffic. Thus, service center 190 may receive a connection request that identifies device 150 by the GUID rather than by a MAC address. The access network 205 may maintain a database of GUID/MAC pairs, and subsequent communications between the RBO 195 and the service center may rely on the GUID to identify device 150, rather than requiring transmission of the MAC address, as described in more detail with reference to FIG. 3.

In some cases, mobile vehicle 135 may be associated with or identified by various vehicle data items, such as a vehicle identifier (e.g., a tail number or vessel ID), fleet identifier, trip number (e.g., flight number), route identifier, trip duration, origination terminal identifier, destination terminal identifier, scheduled or actual departure time or date, and/or scheduled or actual arrival time or date, for example.

In some cases, RBO 195 may transmit the GUID and various vehicle data items to service center 190 via service connection 197. The service center 190 may be able to use this information to associate the GUID (and thus, device 150) with a particular mobile vehicle, and configure the portal based on the vehicle identifiers. For example, the service center 190 may configure the portal to provide different premium network service options or pricing based on a flight number or a route, for example.

In some cases, mobile vehicle 135 may include a vehicle monitoring unit 180 that includes on-board electronics for monitoring and transmitting data associated with a status of the mobile vehicle 135 and/or with operational events associated with the mobile vehicle 135. Vehicle monitoring unit 180 may include sensors, processors, servers, transceivers, or other relevant electronics to enable vehicle monitoring unit 180 to detect and/or monitor status and operational events associated with mobile vehicle 135 and transmit (e.g., to RBO 195) a set of vehicle status values associated with the status and operational events. For example, vehicle monitoring unit 180 may monitor vehicle status such as the position of mobile vehicle 135 (e.g., altitude, longitude, latitude, elapsed distance from an origination terminal, etc.). Vehicle monitoring unit 180 may monitor vehicle status such as an elapsed trip duration or an estimated time of arrival, for example.

Operational events monitored by vehicle monitoring unit 180 may depend on the type of mobile vehicle. Example operational events may include a departure or arrival event, such as a take-off or landing, a "weight on wheels" or "weight off wheels" event, a docking or undocking event, etc. Such operational events may include an embarkation event, such as a "door opened" or "door closed" event or a "gangway lowered" or "gangway raised" event. Such operational events may include an actual departure time or an actual arrival time.

In some cases, mobile vehicle 135 may include vehicle-specific communication or control buses, which may operate according to a protocol such as an ARINC (Aeronautical Radio, INC.) avionics protocol, that may be used to monitor, record, or control various status or operational events associated with mobile vehicle 135. Vehicle monitoring unit 180 may be connected to the vehicle-specific communication or control buses for obtaining information for the operational events of the vehicle. In some cases, RBO 195 may transmit vehicle status values to service center via service connection 197, for example. Such vehicle status values may be associated with a vehicle identifier, for example. The service center may be able to use the vehicle status information to configure the portal for a device based on the vehicle status values. For example, the service center 190 may configure the portal to provide different premium network service options or pricing based on an altitude or an estimated time of arrival.

FIG. 2 shows an access network 205 that supports mobile connectivity provisioning for segregated order management, in accordance with aspects of the present disclosure. Access network 205 includes NOC 170, RBO 195, ground station 115, and network access terminal 185 along with various communication links 160, 165, 192 between these elements, as described with reference to FIG. 1. Collectively, access network 205 may be configured to provide network services to devices 150 on a mobile vehicle 135. Access network 205 may communicate directly with service center 190 via service connection 197, for example. Access network 205 may communicate with an external network 120 via a traffic connection 175. Access network 205 may communicate indirectly with service center 190 via traffic connection 175 and external network 120, for example.

Figure 3:
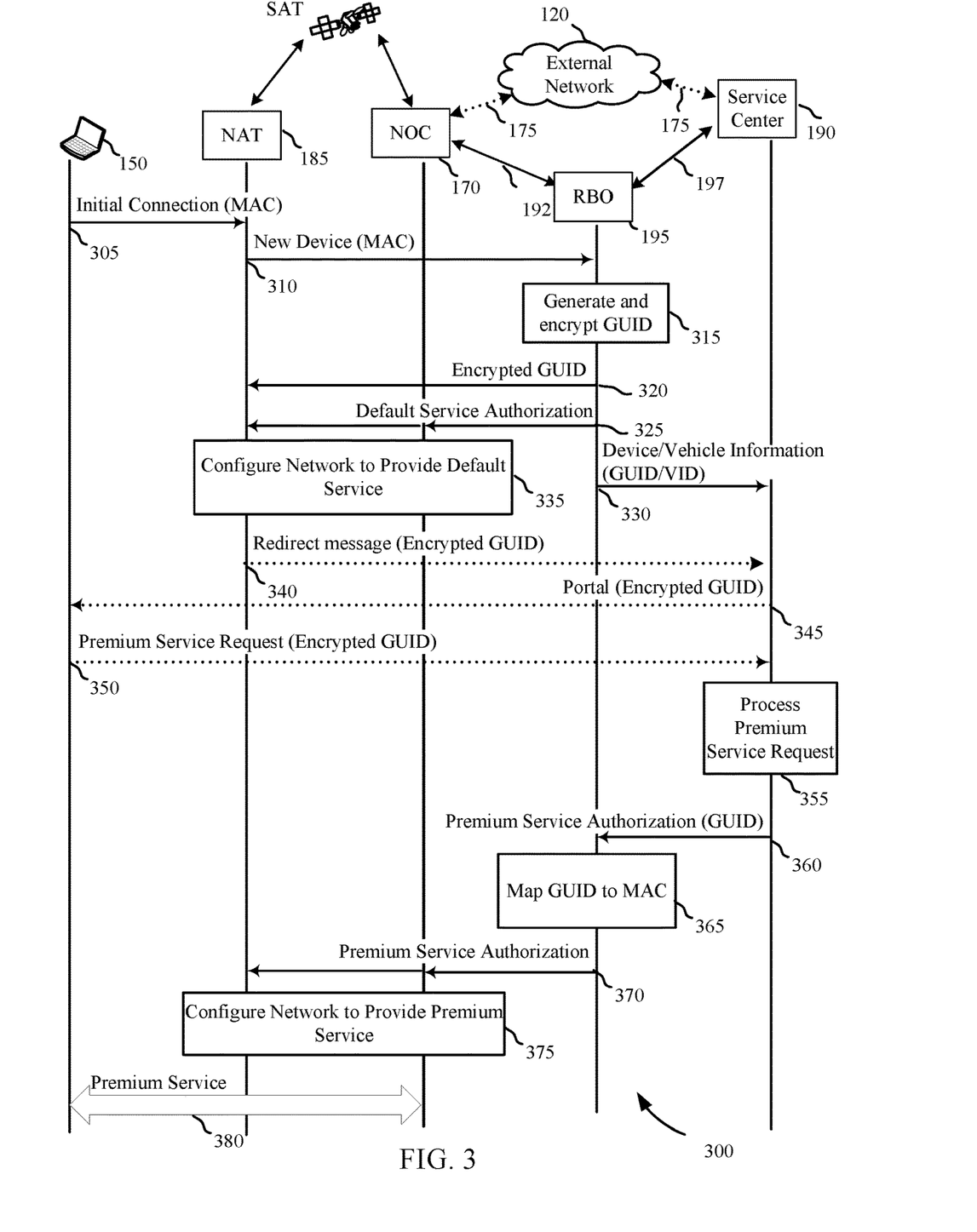
FIG. 3 shows a signal flow diagram that supports mobile connectivity provisioning for segregated order management, in accordance with aspects of the present disclosure.

FIG. 3 depicts a signal flow that supports mobile connectivity provisioning for segregated order management, in accordance with aspects of the present disclosure. The signal flow may provide additional details regarding the operation of communication system 100 and access network 205 described with respect to FIGS. 1-2.

At 305, a device 150 may request an initial network connection by transmitting a connection request to the network access terminal 185 on mobile vehicle 135. The device 150 may request the network connection when it is turned on, for example, or when a user of device 150 attempts to connect to a network (e.g., Wi-Fi) on mobile vehicle 135. The connection request may identify the device 150 using the MAC address of the device 150.

At 310, the network access terminal 185 may transmit an indication of the connection request for the device 150 to the RBO 195 of access network 205. The indication of the connection request may identify the device 150 using the MAC address. The network access terminal 185 may transmit the indication of the connection request to the RBO 195 via communication link 160, 165, and/or 192, for example.

At 315, the RBO 195 may receive the indication of the connection request that identifies the requesting device 150 by the MAC address and may generate a GUID associated with the MAC address. The RBO 195 may generate and encrypt the GUID using a computing system, such as access network computing system 405 described with respect to FIG. 4, for example. In some cases, the RBO 195 may encrypt the GUID using one of various encryption algorithms.

At 320, the RBO 195 may transmit a message that includes the GUID to NOC 170 and network access terminal 185. In some cases, the GUID may be transmitted as an encrypted GUID to reduce the likelihood of a third party associating the GUID with the MAC address.

At 325, the RBO 195 may transmit a default network service authorization to the NOC 170 and the network access terminal 185 to cause NOC 170 and network access terminal 185 to be configured to provide the default network service. The default network service authorization may identify the device 150 using the MAC address.

At 335, the NOC 170 and the network access terminal 185 may receive the default service authorization from the RBO 195 and may be configured, based on the default service authorization, to provide the default service to device 150. For example, a firewall of network access terminal 185 may be configured to permit device 150 to send and/or receive traffic over the link to the NOC 170. NOC 170 may add device 150 to a list of devices that are allowed limited bandwidth access to external network 120, and may be allowed limited access to destination addresses on external network 120 (e.g., service center 190). In some cases, network access terminal and/or NOC 170 may be configured to perform traffic management functions (e.g., prioritization, traffic shaping) to support the device 150 according to the default service.

At 330, the RBO 195 may transmit the GUID and a set of vehicle data items to the service center 190. In some cases, RBO 195 may transmit the GUID and the set of vehicle data items via service connection 197. In some cases, the set of vehicle data items for mobile vehicle 135 may include one or more of a vehicle identifier (such as a flight number or tail number), a route number, an origination terminal, a destination terminal, and/or a route duration. RBO 195 may transmit the GUID and the vehicle data items to service center 190 to enable service center 190 to associate a device 150 identified by the GUID with a particular mobile vehicle 135 and/or to configure a portal served to device 150 based on one or more of the vehicle data items. For example, a service center 190 may configure a portal to display different premium network service options or pricing based on a route duration. For example, on a short route, the service center may configure the portal to provide two options: a one-hour access to a premium network service, or a full-route access to the premium network service. On a long route, the service center may configure the portal to provide options for one-hour, three-hour, or full-route access to the premium network service.

At 340, the network access terminal 185 may redirect the connection request to the service center 190. The redirect may cause any URL requested by the device 150 to be redirected to a URL associated with a service portal served by the service center. In some cases, the redirect may be a port redirect, which may cause the MAC address of the device to be mapped for the source address of the redirect to an IP address of the network access terminal and a port number associated with the device 150 on the local network (e.g., local to the network access terminal 185 or the access network 205).

The redirected connection request may identify the device 150 using the encrypted GUID. For example, the encrypted GUID may be included in an HTTP request sent to the service center. In some cases, the redirected connection request may be transmitted from the network access terminal 185 to the service center 190 via traffic connection 175. The service center 190 may subsequently use the GUID to identify device 150 in communications with RBO 195 via service connection 197, thereby avoiding transmission of the MAC address on service connection 197.

At 345, the service center 190 may serve a portal to device 150. In some cases, the service center may serve the portal by transmitting a message that includes web content (e.g., HyperText Markup Language (HTML), Javascript, Cascading Style Sheets (CSS), etc.) or a URL via traffic connection 175 to cause the portal to be presented (e.g., displayed) on device 150. The message may identify device 150 using the GUID. A user of device 150 may subsequently be able to access the portal on device 150 and order a premium network service via the portal. In this manner, device 150 may be permitted to communicate with service center 190 via traffic connection 175. In some cases, the service center 190 may include the GUID that identifies device 150 in the content served to device 150 to ensure requests (e.g., for premium service) transmitted from the device 150 via the portal are associated with the correct GUID. In some cases, the GUID and the content served to device 150 are encrypted during transmission to reduce the likelihood of a third party determining the relationship between the GUID and the device 150.

At 350, device 150 may transmit a request for a premium network service to service center 190. In some cases, device 150 may transmit the request for premium network service in response to receiving an indication, from the user, of a selection of a premium network service from the portal. For example, the selection may include entering payment or other authorization information (e.g., a credit card or other account information such as a username and password) into the portal and submitting the information to the service center 190. Along with authorization information, the user may send an indication of acceptance of terms and conditions of the external service provider for use of a network service (e.g., by clicking on an "accept" option in the portal web page). In some cases, device 150 may transmit the request for the premium network service via traffic connection 175. In some cases, the request for the premium network service may identify device 150 using the GUID. In some cases, the GUID and the request are encrypted during transmission to reduce the likelihood of a third party determining a relationship between the GUID and the device 150.

At 355, the service center 190 may receive and process the premium network service request. In some cases, the service center 190 may process the premium network service request by processing a payment received from device 150 and identifying a premium network service to provide to device 150. In some cases, the service center 190 may map the GUID received with the premium network service request to the GUID received at 330 from RBO 195 to associate device 150 with a particular mobile vehicle 135.

At 360, service center 190 may transmit a message that includes a premium network service authorization to RBO 195 via service connection 197. The premium network service authorization may identify device 150 using the GUID; e.g., by including the GUID in the message. The premium network service authorization may include an indication of the premium network service (e.g., selected from one or more service options differentiated by data rate, time, data cap, etc.) to be provided to device 150.

At 365, the RBO 195 may map the GUID received from the service center 190 to the associated MAC address. The RBO 195 may map the GUID to the MAC address using a GUID/MAC database, for example, such as GUID/MAC database 430 described with respect to FIG. 4.

At 370, the RBO 195 may transmit a message that includes a premium network service authorization to the NOC 170 via communication link 192 and to the network access terminal 185 via communication links 192, 165, and 160. The premium network service authorization may identify the device 150 using the MAC address and/or the GUID of the device 150.

At 375, the access network 205 may be configured, based on the message received from RBO 195, to provide the premium network service to device 150. For example, NOC 170 may be configured to perform traffic shaping or other functions that may be required to provide the premium network service to device 150. Network access terminal 185 may be configured to permit device 150 to access websites on the external network or to access other content associated with the premium network service 150.

At 380, the device 150 may begin accessing the premium network service configured by the access network 205 (e.g., including NOC 170 and network access terminal 185). For example, the device 150 may make requests for content (e.g., web pages, streaming video, email, messaging, etc.) via URLs accessible on the external network, and the content may be provided to the device 150.

In the above-described flow, the MAC address of device 150 is not transmitted on service connection 197. That is, network messaging between the RBO 195 and the service center 190 used to carry control and order management information may not include the MAC address or other PII of the device 150. Instead, communications between the RBO 195 and the service center 190 on service connection 197 identify device 150 using the GUID to comply with privacy-related regulations.

As previously noted, in some cases, a service center 190 may configure a portal displayed on device 150 to display premium network service options based on various vehicle data items and/or vehicle status values received from the RBO 195.

In some cases, segregating the order management from the network provisioning as described herein may enable or require a service provider to notify the RBO 195 of a change in network service or a change in the portal configuration for devices 150 on mobile vehicle 135 based on the status of mobile vehicle 135; e.g., based on vehicle status values received from RBO 195. For example, in some cases, network services may be prohibited or restricted for devices 150 on aircraft at altitudes under 10,000 feet. In this case, a service center 190 may, based on receiving vehicle status value(s) indicating that the aircraft (e.g., a mobile vehicle 135) is below 10,000 feet, transmit a request to the RBO 195 to disable network services for one or more devices 150. In some cases, the RBO 195 may receive the request to disable network services for one or more devices 150 and may transmit an indication of the request to NOC 170 and network access terminal 185, which may cause NOC 170 and network access terminal 185 to be configured to disable the network service for the one or more device(s) 150.

In some cases, if the network service provider requires the user to accept terms and conditions prior to accessing the default network service, the RBO 195 may, in response to receiving an initial connection request, determine whether the MAC address in the connection request is associated with (mapped to) a GUID in the GUID/MAC database; e.g., if the device 150 has previously received network services from the access network 205. If the MAC address is associated with a GUID, RBO 195 may determine, based on the mapping, whether the device 150 was previously used to accept the terms and conditions. For example, the RBO 195 may determine if the GUID or a user account associated with the GUID has been used to previously accept the terms and conditions. In some cases, if the RBO 195 determines that the device 150 or user account associated with the device was previously used to accept the terms and conditions, RBO 195 may refrain from requesting acceptance of the terms and conditions from device 150. In some cases, if the RBO 195 determines that the device 150 was not previously used to accept the terms and conditions, RBO 195 may request acceptance of the terms and conditions from device 150 prior to, for example, providing the default network service to device 150.

Figure 4:
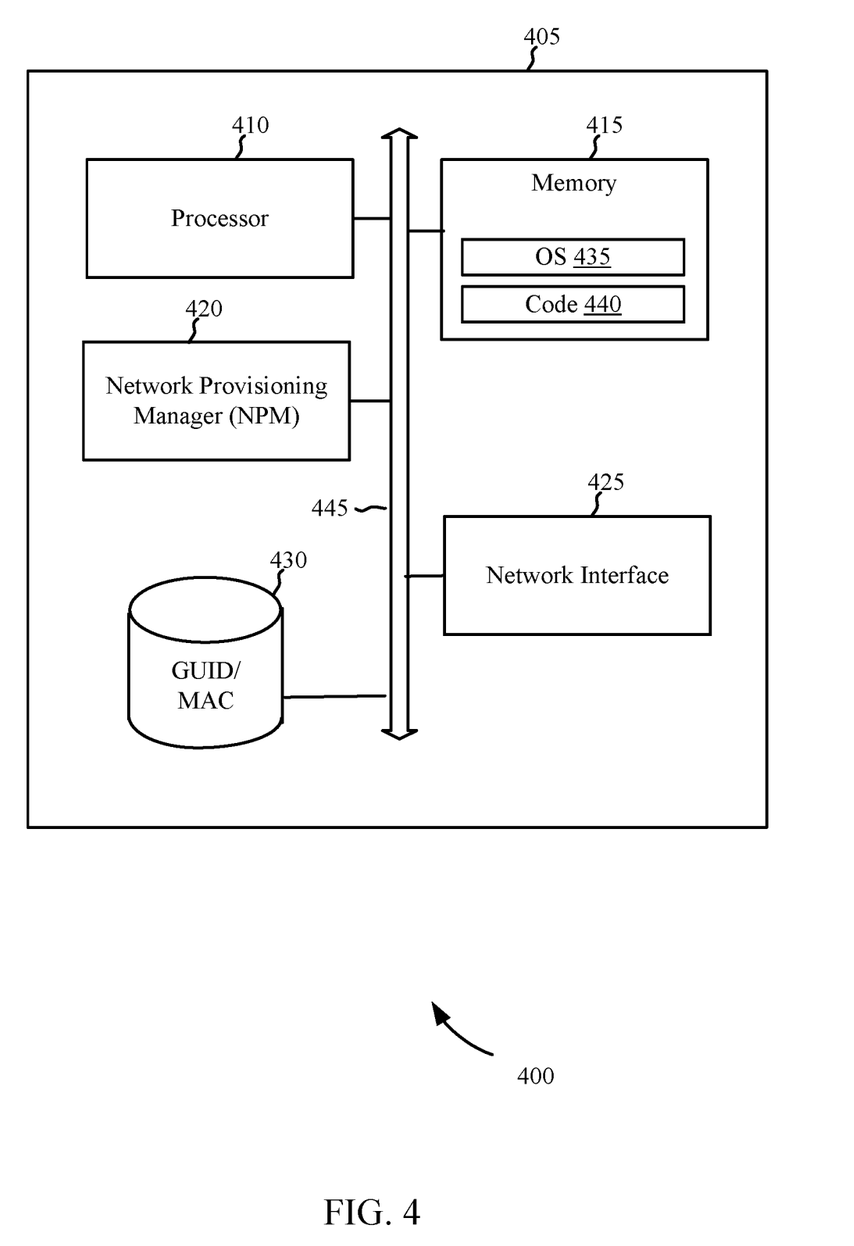
FIG. 4 shows a diagram of a computing system that supports mobile connectivity provisioning for segregated order management, in accordance with aspects of the present disclosure.

FIG. 4 shows a block diagram 400 of an access network computing system 405 that may support mobile connectivity provisioning for segregated order management in accordance with aspects of the present disclosure. The access network computing system 405 may be included in or accessible by NOC 170 and/or RBO 195, for example. The access network computing system 405 may include a processor 410, memory 415, network provisioning manager (NPM) 420, network interface 425, and GUID/MAC database 430. Each of these components may be in communication with each other, directly or indirectly, over one or more buses 445.

The memory 415 may include random access memory (RAM) and/or read-only memory (ROM). The memory 415 may store an operating system (OS) 435 (e.g., built on a Linux or Windows kernel). The memory 415 may also store computer-readable, computer-executable code 440 including instructions that are configured to, when executed, cause the processor 410 to perform various functions described herein related to mobile connectivity provisioning for segregated order management. Alternatively, the code 440 may not be directly executable by the processor 410 but may be configured to cause the computing system 405 (e.g., when compiled and executed) to perform one or more of the functions described herein. The network interface 425 may be used to communicate with a network, such as external network 120. Network interface 425 may be used to receive an indication of a connection request, for example, and may be used to transmit a message that includes a GUID to a network access terminal 185 and/or NOC 170. Network interface 425 may be used to transmit, to a network access terminal 185 and/or NOC 170, an indication of a network service for a device that identifies the device 150 using the MAC address and/or GUID.

NPM 420 may process requests for network access from a device 150 and authorizations for premium network service from service center 190, for example, by determining network configuration information to configure access network to provide the appropriate network service.

NPM 420 may generate a GUID that may be associated with a MAC address. In some cases, NPM 420 may generate a GUID using a random number generator, a time-based GUID generation algorithm, or another GUID generation algorithm. NPM 420 may store GUID/MAC pairs in GUID/MAC database 430.

In some cases, some or all of the GUID/MAC database 430 may be purged. In some cases, the GUID/MAC database may be purged (e.g., all or some of the GUID/MAC pairs may be removed or erased) at regular time intervals, such as every month. In some cases, GUID/MAC pairs may be purged from the GUID/MAC database after an elapsed time from the time at which the respective GUID was generated by NPM 420. In some cases, a GUID/MAC pair associated with a device 150 on a mobile vehicle 135 may be purged from the GUID/MAC database at the end of a trip of the mobile vehicle 135, for example.

In some cases, the components of computing 405 may be located within a single physical location or enclosure. In some cases, the components of computing system 405 may be distributed across multiple physical locations or enclosures. For example, NPM 420 and GUID/MAC pairs database 430 may reside at different locations, which may be different than a location of processor 410, network interface 425, or other components of computing system 405. In some cases, the components of computing system 405 may be distributed across the RBO 195, the NOC 170, and/or another location within NOC 170.

Figure 5:
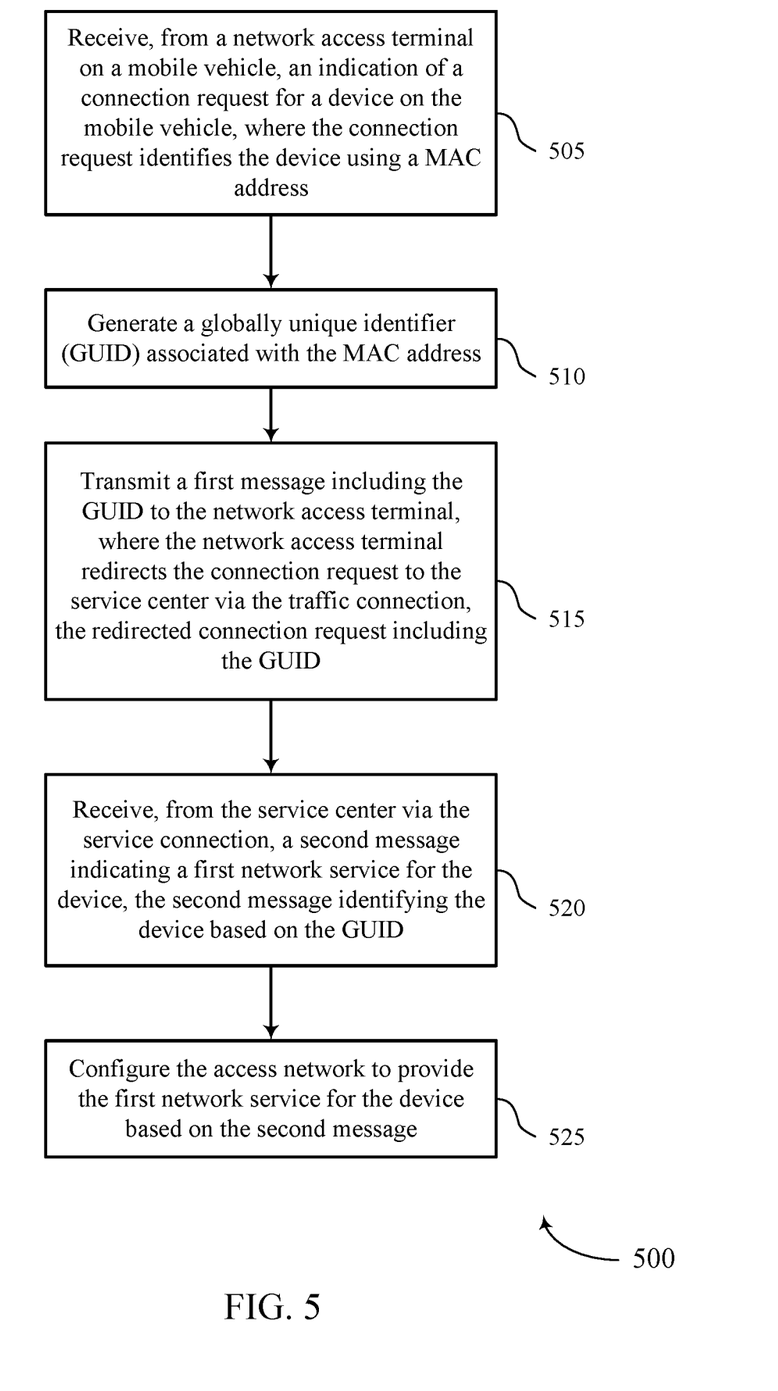
FIG. 5 shows a flow chart of an example method that supports mobile connectivity provisioning for segregated order management, in accordance with aspects of the present disclosure.

FIG. 5 shows a flowchart illustrating a method 500 that supports mobile device provisioning in accordance with aspects of the present disclosure. The method 500 may be performed at an access network that includes a network operation center having a traffic connection to at least one external network (e.g., the Internet), the access network having a service connection (e.g., service connection 197) to a service center (e.g., service center 190) that is external to the access network. The operations of method 500 may be performed by an access network (e.g., access network 205, which may include NOC 170, RBO 195, network access terminal 185, and/or access network computing system 405), as described with reference to FIGS. 1-4.

At 505, the access network may receive, from a network access terminal (e.g., network access terminal 185) on a mobile vehicle (e.g., mobile vehicle 135), an indication of a connection request for a device (e.g., device 150) on the mobile vehicle, where the connection request identifies the device using a MAC address.

At 510, the access network may generate a GUID associated with the MAC address. In some cases, the access network may generate the GUID using a network provisioning manager, such as NPM 420.

At 515, the access network may transmit a first message including the GUID to the network access terminal, where the network access terminal redirects the connection request to a service center (e.g., service center 190) via the traffic connection. In some cases, the redirected connection request includes the GUID. In some cases, the RBO (e.g., RBO 195) of the access network may transmit the first message to the network access terminal. The access network may encrypt the GUID before transmitting the (encrypted) GUID in the first message. In some cases, the GUID may be encrypted by processor 410, for example, using any appropriate encryption algorithm.

At 520, the access network may receive, from the service center via the service connection, a second message indicating a first network service for the device, the second message identifying the device based on the GUID. The first network service may be a premium network service, for example.

At 525, the access network may be configured, based on the second message, to provide the first network service for the device. In some cases, the access network may be configured by configuring the network access terminal and/or the NOC to provide the first network service as described with respect to FIGS. 1-4.

The detailed description set forth above in connection with the appended drawings describes examples and does not represent the only examples that may be implemented or that are within the scope of the claims. The term "example," when used in this description, mean "serving as an example, instance, or illustration," and not "preferred" or "advantageous over other examples." The detailed description includes specific details to provide an understanding of the described techniques. These techniques, however, may be practiced without these specific details. In some instances, well-known structures and apparatuses are shown in block diagram form to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical positions. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for network provisioning, comprising:
   receiving, from an access terminal that provides access to an access network operated by a first organization, an indication of a connection request originating from a device and identifying the device using a media access control (MAC) address;
   generating, based on receiving the indication of the connection request, a globally unique identifier (GUID) associated with the MAC address, wherein the connection request is redirected with the GUID to a service center that is operated by a second organization that is separate from the first organization;
   receiving, from the service center based on the redirected connection request, an indication of a service level for the device, the indication of the service level identifying the device based on the GUID; and
   configuring, based on receiving the indication of the service level, the access network to provide network service to the device at the service level indicated by the service center.

2. The method of claim 1, further comprising:
   mapping the GUID received from the service center to the MAC address of the device based on receiving the indication of the service level for the device, wherein configuring the access network comprises transmitting the indication of the service level for the device to the access terminal, the indication of the service level identifying the device using the MAC address.

3. The method of claim 2, further comprising:
   determining, based on the mapping, whether the device was previously used to accept terms and conditions associated with the access network; and
   refraining, in accordance with a determination that the device was previously used to accept the terms and conditions, from requesting acceptance of the terms and conditions.

4. The method of claim 1, further comprising:
   configuring, based on receiving the connection request and prior to receiving the indication of the service level for the device, the access network to provide the network service to the device at a default service level that permits the device to communicate, with the service center, a service level request for the service level, wherein the service level request comprises the GUID.

5. The method of claim 1, further comprising:
   transmitting, based on generating the GUID, the GUID to the service center via a service connection between the access network and the service center.

6. The method of claim 1, wherein the access terminal is located on a vehicle, the method further comprising:
   transmitting, based on generating the GUID, vehicle information to the service center via a service connection between the access network and the service center, the vehicle information comprising one or more of a vehicle identifier, a route identifier, a fleet identifier, a destination, a trip duration, a position, an estimated time of arrival, an estimated remaining duration, or an indication of a vehicle operational event.

7. The method of claim 6, further comprising:
receiving, from the service center via the service connection and after transmitting the vehicle information, a request to disable the network service for at least the device; and
configuring, in response to receiving the request, the access network to disable the network service for at least the device.

8. The method of claim 1, wherein:
the access network comprises a network operation center having a traffic connection to at least one external network, and
the access network comprises a service connection to the service center, wherein the indication of the service level is received from the service center via the service connection.

9. An access network, comprising:
an access terminal configured to provide access to the access network, wherein the access network is operated by a first organization; and
a remote back office comprising a network provisioning manager configured to:
receive, from the access terminal, a connection request originating from a device and identifying the device using a media access control (MAC) address;
generate, based on receiving the connection request, a globally unique identifier (GUID) associated with the MAC address, wherein the connection request is redirected with the GUID to a service center that is operated by a second organization that is separate from the first organization;
receive, from the service center based on the redirected connection request, an indication of a service level for the device, the indication of the service level identifying the device based on the GUID; and
transmit, based on receiving the indication of the service level, an authorization for the access network to provide network service to the device at the service level indicated by the service center.

10. The access network of claim 9, wherein the network provisioning manager is further configured to:
map the GUID received from the service center in the indication of the service level to the MAC address of the device based on receiving the indication of the service level for the device.

11. The access network of claim 9, wherein:
the network provisioning manager is further configured to transmit, after generating the GUID, the GUID to the access terminal, and
the access terminal is further configured to redirect, in response to receiving the GUID from the network provisioning manager, the GUID to the service center.

12. The access network of claim 9, wherein the network provisioning manager is further configured to:
transmit, to the service center and after generating the GUID, vehicle information, the GUID, or both.

13. The access network of claim 9, wherein the access network further comprises:
a network operations center, wherein the network operations center, the access terminal, or both, are further configured to:
configure the access network to provide the network service to the device at the service level based on the authorization.

14. The access network of claim 9, wherein:
the access network further comprises a network operations center,
the network provisioning manager is further configured to transmit, prior to the authorization, a second authorization for the access network to provide the network service to the device at a default service level based on transmitting the GUID to the access terminal, and
the network operations center, the access terminal, or both, are further configured to:
configure, prior to transmitting the authorization for the access network to provide the network service to the device at the service level, the access network to provide the network service to the device at the default service level based on the second authorization.

15. The access network of claim 14, wherein:
the default service level permits the device to communicate, with the service center, a service level request for the service level, wherein the service level request comprises the GUID, and
the network provisioning manager is further configured to receive the indication of the service level based on the service level request being communicated to the service center.

16. The access network of claim 9, wherein the access network further comprises:
a network operations center having a traffic connection to at least one external network, wherein the network provisioning manager has a service connection to the service center and a backhaul connection to the network operations center.

17. The access network of claim 9, wherein the access network further comprises:
a network operations center that has a network connection to the access terminal via one or more satellites.

18. A method for network provisioning, comprising:
receiving, from a device, a connection request that identifies the device using a media access control (MAC) address;
transmitting, to a network provisioning manager of an access network operated by a first organization, an indication of the connection request;
receiving, from the network provisioning manager in response to the indication of the connection request, a globally unique identifier (GUID) associated with the MAC address;
redirecting the connection request to a service center that is operated by a second organization that is separate from the first organization, the redirected connection request identifying the device using the GUID received from the network provisioning manager;
receiving, from the service center in response to the redirected connection request, information for displaying a portal for the second organization at the device; and
providing the information for displaying the portal to the device.

19. The method of claim 18, further comprising:
receiving, from the network provisioning manager in response to the indication of the connection request, an authorization for the access network to provide network service to the device at a default service level that permits the device to communicate, with the service center, a service level request for a service level, wherein the service level request comprises the GUID; and configuring, based on the authorization, the access network to provide the network service to the device at the default service level, wherein the information for displaying the portal is provided to the device as a result of the access network being configured to provide the network service to the device at the default service level.

20. The method of claim 19, further comprising:

receiving, based on configuring the access network to provide the network service to the device at the default service level, the service level request from the device;

routing the service level request to the service center;

receiving, based on routing the service level request to the service center, a second authorization for the access network to provide the network service to the device at the service level; and configuring, based on the second authorization, the access network to provide the network service to the device at the service level.

* * * * *